Aug. 28, 1962   L. J. DAWES   3,051,510

HYDRAULIC CONNECTING STRUCTURE

Filed Nov. 19, 1959

United States Patent Office

3,051,510
Patented Aug. 28, 1962

3,051,510
HYDRAULIC CONNECTING STRUCTURE
Leslie J. Dawes, Van Nuys, Calif., assignor to The
Bendix Corporation, a corporation of Delaware
Filed Nov. 19, 1959, Ser. No. 854,112
6 Claims. (Cl. 285—31)

This invention relates to connectors for fluid lines, and more particularly to connectors of the union type for making and breaking fluid connection between two members that are rigidly mounted in a fixed relation to each other.

An object of the invention is to provide a simple and inexpensive union-type connector capable of sealing against high pressure and capable of being readily connected and disconnected without distorting the connected members.

Another object is to provide a union-type connector capable of providing an exceptionally rigid mechanical connection between the connected elements.

Other more specific objects and features of the invention will appear from the description to follow with reference to the drawing.

Figure 1:
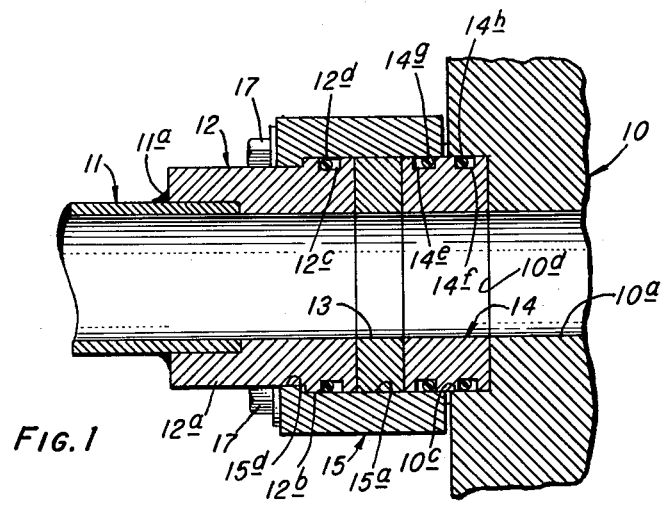
FIG. 1 is a longitudinal section of a connecting structure in accordance with the invention.
Figure 2:
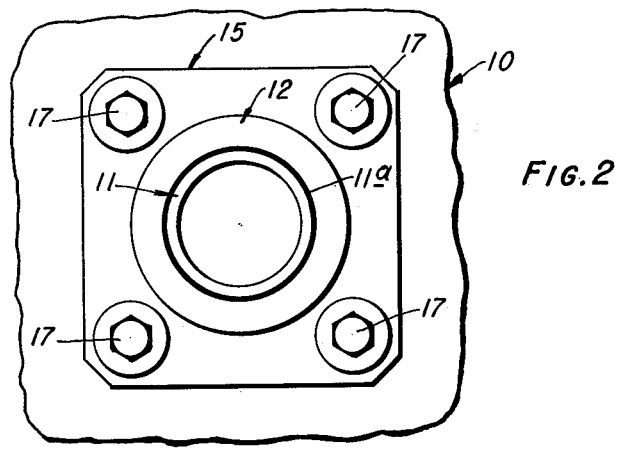
FIG. 2 is an end elevational view of the structure, looking at the left end of FIG. 1.

Referring to FIG. 1, a body member 10 having a port 10a is shown connected to a fluid-conducting pipe 11 by a connecting structure in accordance with the invention.

This connecting structure comprises a tubular member 12 which may be rigidly connected, as by welding 11a to the pipe 11, a first spacer 13, a second spacer 14, and a sleeve 15.

The tubular member 12 has a neck portion 12a and a head portion 12b of larger diameter than the neck portion and dimensioned to slidably fit in the bore 15a of the sleeve 15. The outer cylindrical surface of the head 12b has an annular groove 12c containing an O-ring seal 12d, which seals with the bore 15a of the sleeve 15.

The second spacer 14 has a cylindrical outer surface of the same diameter as the head 12b and is also a free sliding fit in a counterbore 10c in the body 10 at the outer end of the fluid port 10a. The spacer 14 is of length to extend out of the counterbore into the sleeve 15, and has annular grooves 14e and 14f containing O-ring seals 14g and 14h, which seal respectively with the bore of the sleeve 15 and the counterbore 10c. The sleeve 15 has an internal flange 15d at is outer end which bears against the outer edge of the head 12b.

The sleeve 15 is detachably secured to the body 10 by screws 17, and by tightening the screws the first and second spacers 13 and 14 are pressed tightly between the member 12 and the end face 10d of the counterbore 10c in the body 10. This anchors the parts so that there can be no relative vibration between them.

The connection can be easily broken without relative movement between the body 10 and the member 11 by simply removing the screws 17 and sliding the sleeve 15 to the left, clear of the spacers 13 and 14. This permits removal of the first spacer 13 by sliding it laterally out from between the tubular member 12 and the spacer 14. This effects complete mechanical separation between the tubular member 12 and body 10 so that one or the other may be removed if desired.

Oftentimes in devices of this kind, it is only necessary to renew the packings. This can be readily done by first sliding the sleeve 15 completely clear of both the spacers and the head 12b, and removing the first spacer 13 as previously described. This fully exposes the packings 12d and 14g so that they can be replaced. The packing 14h can be made accessible by sliding the second spacer 14 out of the counterbore 10c.

Preferably the spacer 13 is made of greater length than the depth of the counterbore 10c, so that when the spacer 13 is removed the spacer 14 can be slipped longitudinally completely out of the counterbore 10c, and then removed laterally away from the rest of the assembly.

It will be apparent from the foregoing description that the structure can be easily assembled and disassembled without relative movement of the pipe 11 and the tubular member 12, with respect to the body 10. Also, the parts 12, 13 and 14 can be rigidly clamped in place with negligible relative movement between the member 12 and the body 10 because of the fact that there are no compressible elements interposed between the members 12 and 10.

The use of pressure-responsive seals, such as the O-rings disclosed, between the cylindrical surfaces of the members 12, 13 and 14 and the members 15 and 10 insures effective sealing without introducing appreciable resistance to removal and replacement of the spacer element 14 with respect to the counterbore 10c, and removal of the sleeve member 15.

Although for the purpose of describing the invention a particular embodiment thereof has been shown and described, obvious modifications will occur to a person skilled in the art, and I do not desire to be limited to the exact details shown and described.

I claim:

1. A joint structure for making fluid connection between two members rigidly fixed with respect to each other, one of said members being a body member having a port and a counterbore at the outer end of the port, and the other member being a fluid-conducting member, said structure comprising: a head portion with a cylindrical external surface of diameter slightly less than said counterbore on said tubular fluid-conducting member; first and second rigid tubular spacers, said second spacer having an external cylindrical surface of the same diameter as said head portion for slidably fitting in said counterbore and being of length greater than said counterbore, and said first spacer having radial dimensions corresponding to said second spacer for fitting between said head portion of said tubular member and said second spacer for spacing them apart; the ends of said first spacer and the abutting ends of the adjacent members being substantially perpendicular to the axis of said head portion and body member; a retaining sleeve having a cylindrical bore dimensioned to slidably fit over said head and spacers and maintain them in alignment; first sealing means on said head for sealing between the cylindrical surface of said head and said sleeve; second sealing means on said second spacer adjacent one end thereof for sealing between the cylindrical surface of said second spacer and said sleeve; third sealing means on said second spacer adjacent the other end thereof for sealing between the cylindrical surface of said second spacer and the cylindrical surface of said counterbore; the distance between the face of the body member and the end of the head portion being at least equal to the distance between said third sealing means and said one end of said second spacer whereby upon the removal of said first spacer said second spacer may be moved axially towards said head portion, thereby exposing said third sealing means, and means for detachably securing said sleeve to said body member.

2. Apparatus according to claim 1 in which the length of said first spacer exceeds the depth of said counterbore.

3. Apparatus according to claim 1 in which said tubular member has a reduced neck portion next to said head portion and said retaining sleeve has an internal flange at its outer end slidable over said neck portion and engageable against said head portion.

4. Apparauts according to claim 1 in which said sealing means are responsive to fluid pressure to increase their sealing effect.

5. Apparatus according to claim 4 in which each of said sealing means comprises an annular groove in its associated cylindrical surface and an O-ring in said groove.

6. Apparatus comprising: a body member defining a port and a counterbore at the outer end of said port; a tubular fluid-conducting member in substantially rigidly fixed, spaced relation to said body member and having a fluid port aligned with said body member port in said body member and having a head portion with a cylindrical external surface; first and second rigid tubular spacers interposed between said fluid-conducting member and said body member, said first spacer being positioned against the said tubular member and said second spacer being of length greater than said counterbore and in abutting relation with said first spacer and the inner end of said counterbore, and having a cylindrical external surface and the ends of said first spacer and the abutting ends of the adjacent members being substantially pependicular to the axis of said head portion and said body member; a retaining sleeve having a cylindrical bore slidable over said head and spacers; means for detachably securing said sleeve to said body member; first sealing means between the cylindrical surface of said head and said sleeve; second sealing means between the cylindrical surface of said second spacer and said sleeve; and third sealing means between the cylindrical surface of said second spacer and the cylindrical surface of said counterbore; the distance between the face of the body member and the end of the head portion being at least equal to the distance between said third sealing means and said one end of said second spacer whereby upon the removal of said first spacer said second spacer may be moved axially towards said head portion, thereby exposing said third sealing means.

References Cited in the file of this patent

UNITED STATES PATENTS

| 1,615,536 | Del Mar | Jan. 25, 1927 |
| 2,652,895 | Arrowood | Sept. 22, 1953 |
| 2,749,149 | Carpenter | June 5, 1956 |
| 2,862,731 | Hedden et al. | Dec. 2, 1958 |
| 2,812,262 | Franck | Nov. 10, 1959 |
| 2,981,557 | Donnell et al. | Apr. 25, 1961 |

FOREIGN PATENTS

| 558,775 | Canada | June 10, 1958 |